United States Patent
Togari et al.

(10) Patent No.: US 11,968,121 B2
(45) Date of Patent: Apr. 23, 2024

(54) CONTROL APPARATUS, CONTROL METHOD AND PROGRAM

(71) Applicant: Nippon Telegraph and Telephone Corporation, Tokyo (JP)

(72) Inventors: Yukihiro Togari, Tokyo (JP); Hisashi Kojima, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 459 days.

(21) Appl. No.: 17/427,841

(22) PCT Filed: Jan. 31, 2020

(86) PCT No.: PCT/JP2020/003696
§ 371 (c)(1),
(2) Date: Aug. 2, 2021

(87) PCT Pub. No.: WO2020/162361
PCT Pub. Date: Aug. 13, 2020

(65) Prior Publication Data
US 2022/0131796 A1    Apr. 28, 2022

(30) Foreign Application Priority Data

Feb. 6, 2019  (JP) .................... 2019-020141

(51) Int. Cl.
*H04L 45/50* (2022.01)
(52) U.S. Cl.
CPC .................... *H04L 45/50* (2013.01)
(58) Field of Classification Search
CPC ........................................................ H04L 45/50
See application file for complete search history.

(56) References Cited

U.S. PATENT DOCUMENTS

2012/0069740 A1*  3/2012  Lu .................... H10N 70/20
                                                           370/238
2017/0064717 A1   3/2017  Filsfils et al.
(Continued)

FOREIGN PATENT DOCUMENTS

| CN | 109218189 | 1/2019 |
|----|-----------|--------|
| WO | WO 2017198319 | 11/2017 |
| WO | WO 2018033769 | 6/2019 |

OTHER PUBLICATIONS

Filsfils et al., "Segment Routing Policy Architecture draft-ietf-spring-segment-routing-policy-02.txt," SPRING Working Group Internet-Draft, Oct. 22, 2018, 33 pages.
(Continued)

*Primary Examiner* — Luat Phung
(74) *Attorney, Agent, or Firm* — Fish & Richardson P.C.

(57) ABSTRACT

A control apparatus configured to, in a network constituted by the multiple communication apparatuses, control one or more anchor nodes designated in advance among the multiple communication apparatuses, includes: a route creation unit configured to create route information including labels of communication apparatuses or links to be passed through, based on an input required condition; a route compression unit configured to divide the labels included in the route information in units of anchor nodes, and compress at least a portion of the labels included in the route information into a compressed label that can be expanded in at least one anchor node among the communication apparatuses determined based on the route information, so as not to exceed a processing limit of a communication apparatus determined based on the route information; and a distribution unit configured to distribute information for expanding the compressed label to the at least one anchor node.

7 Claims, 28 Drawing Sheets

(56) References Cited

U.S. PATENT DOCUMENTS

2018/0198706 A1* 7/2018 Ceccarelli ............ H04L 45/033
2020/0213223 A1 7/2020 Peng et al.

OTHER PUBLICATIONS

Guedrez et al., "Label Encoding Algorithm for MPLS Segment Routing," dated Mar. 2017, retrieved from URL <https://www.researchgate.net/publication/311607490_Label_Encoding_Algorithm_for_MPLS_Segment_Routing>, 7 pages.

Sivabalan et al., "Carrying binding label/segment-ID in PCE-based Networks, draft-sivabalan-pce-binding-label-sid-05," PCE Working Group Internet-Draft, Oct. 19, 2018, 12 pages.

Tantsura et al., "The critical role of Maximum SID Depth (MSD)hardware limitations in Segment Routing ecosystem and how to work around those," NANOG71, Oct. 2, 2017, retrieved from URL <https://pc.nanog.org/static/published/meetings/NANOG71/1424/20171004_Tantsura_The_Critical_Role_v1.pdf>, 21 pages.

Togari et al., "A study of label pushing reduction mechanism for SR-MPLS," IEICE General Conference Lecture Proceedings, Mar. 5, 2019, Communication 2:p. 82, 3 pages (With English Translation).

* cited by examiner

PUSHED BY H_0    PUSHED BY H_1

Fig. 12

| ITEM | SETTING CONTENT |
|---|---|
| DATA TRANSMISSION INTERVAL | DETERMINE DATA TRANSMISSION INTERVAL SUCH AS 30 SECONDS OR 60 SECONDS |
| TRANSMISSION DATA RANGE | CHANGE CONTENT OF TRANSMISSION DATA BY SELECTING AN ITEM BELOW<br>•TRANSMIT ALL DATA<br>•TRANSMIT DATA OF CHANGED LOCATION<br>•TRANSMIT DATA OF SPECIFIC AREA |
| ⋮ | ⋮ |

Fig. 13

| LABEL INFORMATION | LABEL ATTRIBUTE | Local index | STATE INFORMATION |
|---|---|---|---|
| 16001 | Global. Node SID OF ROUTER A | 1 | CONNECTION DESTINATION ROUTER B, C |
| 16002 | Global. Node SID OF ROUTER B | 1 | CONNECTION DESTINATION ROUTER A, C |
| 16003 | Global. Node SID OF ROUTER C | 1 | CONNECTION DESTINATION ROUTER B, A |
| 6001 | Local. Peer SID OF ROUTER A | 2 | LINK USAGE RATE 30% |
| 6002 | Local. Adj SID OF ROUTER A | 3 | LINK USAGE RATE 90% |

Fig. 14

| Prefix | Router -ID/ Originator | INFORMATION OF PREVIOUS INSTANCE OF TRANSMISSION | DIFFERENCE FROM PREVIOUS INSTANCE OF TRANSMISSION |
|---|---|---|---|
| 172.10,1.0/24 | 10.10.10.1 | 172.10,1.0/25 | PRESENT |
| 172.10,2.0/24 | 10.10.10.2 | 172.10,2.0/24 | NONE |

Fig. 16

| POLICY | SETTING CONTENT |
|---|---|
| POLICY1 | TRANSFER FROM INGRESS ROUTER OF AS1 TO EGRESS ROUTER OF AS3 VIA SERVICE FUNCTION OF AS2 |
| POLICY2 | PERFORM TRANSFER BYPASSING LINK A OF AS1 AND SUPPRESSING DELAY TO 100 msec OR LESS |
| ⋮ | ⋮ |

Fig. 18

| LABEL INFORMATION | LABEL ATTRIBUTE | STATE INFORMATION |
|---|---|---|
| 16001 | Node SID OF ROUTER A (ASBR) | CONNECTION DESTINATION ROUTER B, C |
| 6001 | Peer SID OF ROUTER A (ASBR) | CONNECTION DESTINATION ROUTER B, C |
| 16002 | Node SID OF ROUTER B (ABR) | CONNECTION DESTINATION ROUTER B, C |

Fig. 20

| SR POLICY | ANCHOR NODE | CONTENT OF BSID | SID-LIST OF ROUTE |
|---|---|---|---|
| SR POLICY 1 | ROUTER A | BSID:100 <10,20,30> | <16001,100(BSID), 16005> |
| SR POLICY 2 | ROUTER A ROUTER B | BSID:100 <10,20,30> BSID:200 <16005> | <16001,100(BSID), 200(BSID)> |
| SR POLICY 2´ | ROUTER A | BSID´:100 <10,20,30,16005> | <16001,100(BSID´)> |
| ⋮ | ⋮ | ⋮ | ⋮ |

CONTROL APPARATUS, CONTROL METHOD AND PROGRAM

CROSS-REFERENCE TO RELATED APPLICATIONS

This application is a National Stage application under 35 U.S.C. § 371 of International Application No. PCT/JP2020/003696, having an International Filing Date of Jan. 31, 2020, which claims priority to Japanese Application Serial No. 2019-020141, filed on Feb. 6, 2019. The disclosure of the prior application is considered part of the disclosure of this application, and is incorporated in its entirety into this application.

TECHNICAL FIELD

The present invention relates to a control apparatus, a control method, and a program.

BACKGROUND ART

SR (Segment Routing) has been receiving attention as a network technique for realizing flexible TE (Traffic Engineering) and SFC (Service Function Chaining).

For example, it is possible to induce traffic in a link with a low usage rate by constantly acquiring the bandwidth usage rate of the link and performing control through SR using a traffic influx port (GW (Gateway), etc.) with respect to a large amount of traffic, such as a DDoS (Distributed Denial of Service) attack, or a burst-like increase in traffic resulting from viewing of a specific video or the like.

SR-MPLS, in which SR is applied to an MPLS (Multi-Protocol Label Switching) network, can achieve an improvement in scalability and a simplification of MPLS. In SR-MPLS, labels called SIDs (Segment IDs) are used, and route information is exchanged by adding SIDs to a route advertisement using a protocol (augmented IGP) obtained by augmenting an IGP (Interior Gateway Protocol). Since labels stacked in a packet fulfill the role of a route information table during packet transfer, as long as the SR policy is understood, an intermediate router does not need to hold all route information.

In SR-MPLS, three types of SIDs called Node-ID, Adj-SID (Adjacency-SID), and Peer-SID are used. A Node-ID is defined for each node and is used when transferring to a node in accordance with the shortest route of an IGP. An Adj-SID is defined for each interface and is used when explicitly designating a link to be passed through. A Peer-SID is used for transfer between ASs (Autonomous Systems). FIG. 1 shows an overview of route designation in SR-MPLS. For example, if transfer is to be performed using the shortest route determined using an IGP from node A to node D, the label of node D (Node-ID) is set in the packet to be transmitted by node A. For example, if the link between C and E is to be passed through instead of performing transfer using the shortest route from node A to node D, the labels of the node C (Node-ID), the link (Adj-ID) between C and E, and the node D (Node-ID) are set in the packet transmitted by the node A. The setting of these labels can be performed by an external apparatus such as a controller.

CITATION LIST

Non-Patent Literature

[NPL 1] PCE Working Group Internet-Draft, "Carrying Binding Label/Segment-ID in PCE based Networks", draft-sivabalan-pce-binding-label-sid-05, Oct. 19, 2018

[NPL 2] SPRING Working Group Internet-Draft, "Segment Routing Policy Architecture", draft-ietf-spring-segment-routing-policy-02, Oct. 22, 2018

[NPL 3] Rabah Guedrez, et al, "Label Encoding Algorithm for MPLS Segment Routing", March 2017

[NPL 4] "The critical role of Maximum SID Depth (MSD) hardware limitations in Segment Routing ecosystem and how to work around those", NANOG71, October 2017, Internet <URL: https://pc.nanog.org/static/published/meetings/NANOG71/1424/20171004_Tantsura_The_Critical_Role_v1.pdf>, searched for on Jan. 8, 2019

SUMMARY OF THE INVENTION

Technical Problem

In TE using SR-MPLS, it is envisioned that many labels are stacked in a packet. For example, in a use case such as congestion avoidance, it is necessary to perform TE in which a link through which traffic is to be passed is directly designated. In order to robustly perform route control with respect to a change in link cost resulting from breakdown, it is important to individually designate the links to be subjected to TE. As is evident based on FIG. 1, each time a link is designated, the number of labels stacked in the packet increases. Also, if SR is applied in a multi-area, multi-AS network, it is necessary to pass through an area border router (ABR) or an AS border router that serves as a border with an adjacent area or AS, and it is necessary to explicitly stack SIDs.

As a result, it is also conceivable that the number of labels stacked in the packet will exceed the processing limit of the router, and in this case, flexible traffic control using SR is difficult. Also, the overhead increases accompanying an increase in the number of labels stacked in the packet.

Conventionally, a case has been considered in which the number of stacked labels is temporarily reduced by replacing multiple SIDs (labels) with a single BSID (Binding SID) (performing compression) (NPL 1, 2). For example, a controller compresses multiple labels <16003, 16004> into one BSID <40164> and advertises the result in some routers (GW, etc.). When a router in which the BSID <40164> was advertised receives a packet to which the BSID <40164> was added, the router converts (expands) the BSID <40164> into the original list of labels <16003, 16004> and performs transfer in accordance with the expanded SIDs.

However, if BSIDs are to be allocated in units of ASs, many labels will be needed for TE in an AS. Even if an AS is divided into multiple areas and BSIDs are allocated in units of areas, the BSIDs that are to be pushed in an ingress router increase in number accompanying an increase in the number of areas, and therefore multiple labels will be needed.

The present invention proposes a scheme for reducing the number of labels stacked in a packet in SR.

Means for Solving the Problem

A control apparatus according to an aspect of the present invention is a control apparatus configured to, in a network constituted by a plurality of communication apparatuses, control one or more anchor nodes designated in advance among the plurality of communication apparatuses, the control apparatus including:

a route creation unit configured to create route information including labels of communication apparatuses or links to be passed through, based on an input required condition;

a route compression unit configured to divide the labels included in the route information in units of anchor nodes, and compress at least a portion of the labels included in the route information into a compressed label that can be expanded in at least one anchor node among the communication apparatuses determined based on the route information, so as not to exceed a processing limit of a communication apparatus determined based on the route information; and a distribution unit configured to distribute information for expanding the compressed label to the at least one anchor node.

Also, a control method according to an aspect of the present invention is a control method to be executed by a control apparatus configured to, in a network constituted by a plurality of communication apparatuses, control one or more anchor nodes designated in advance among the plurality of communication apparatuses, the control method including:

a step of creating route information including labels of communication apparatuses or a links to be passed through, based on an input required condition;

a step of dividing the labels included in the route information in units of anchor nodes, and compressing at least a portion of the labels included in the route information into a compressed label that can be expanded in at least one anchor node among the communication apparatuses determined based on the route information, so as not to exceed a processing limit of a communication apparatus determined based on the route information; and a step of distributing information for expanding the compressed label to the at least one anchor node.

Also, a program according to an aspect of the present invention causes a computer to function as the units of the above-described control apparatus.

Effects of the Invention

The present invention makes it possible to reduce the number of labels stacked in a packet in SR.

BRIEF DESCRIPTION OF DRAWINGS

FIG. 12 is a diagram showing an example of a data transmission information table.

FIG. 13 is a diagram showing an example of a link state information table.

FIG. 14 is a diagram showing an example of a route information table.

FIG. 16 is a diagram showing an example of a policy information table.

FIG. 18 is a diagram showing an example of an anchor node information table.

FIG. 20 is a diagram showing an example of a compressed route management table.

DESCRIPTION OF EMBODIMENTS

Hereinafter, embodiments of the present invention will be described with reference to the drawings.

Logical Configuration of Network

Figure 1:
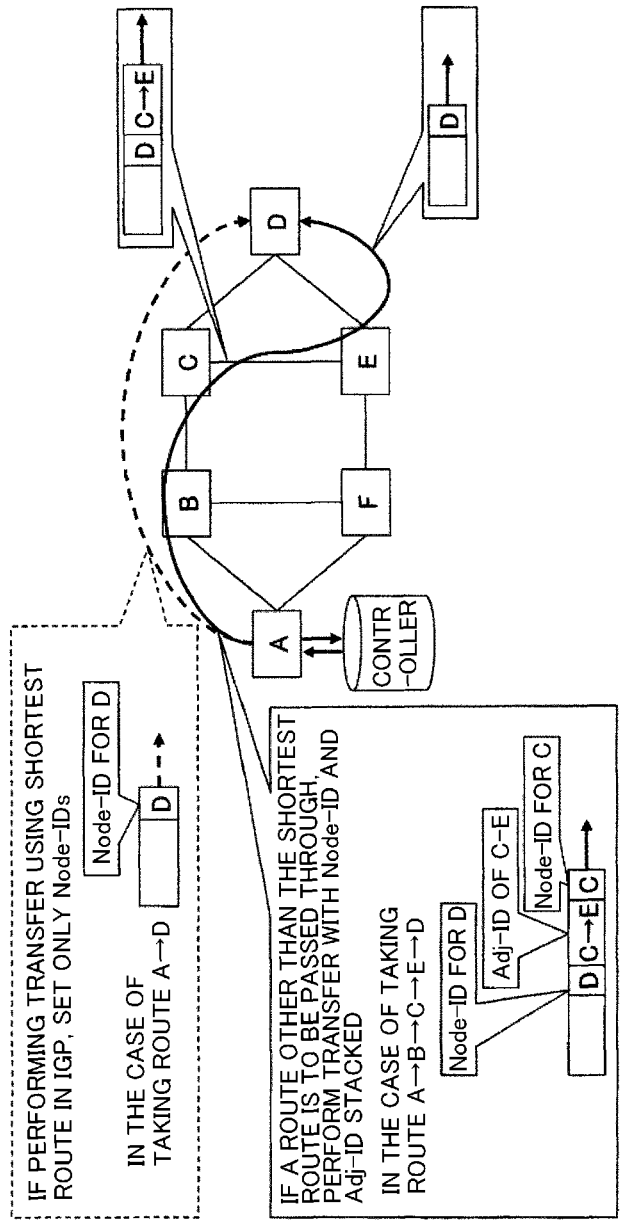
FIG. 1 is a diagram showing an overview of route designation in SR-MPLS.
Figure 2:
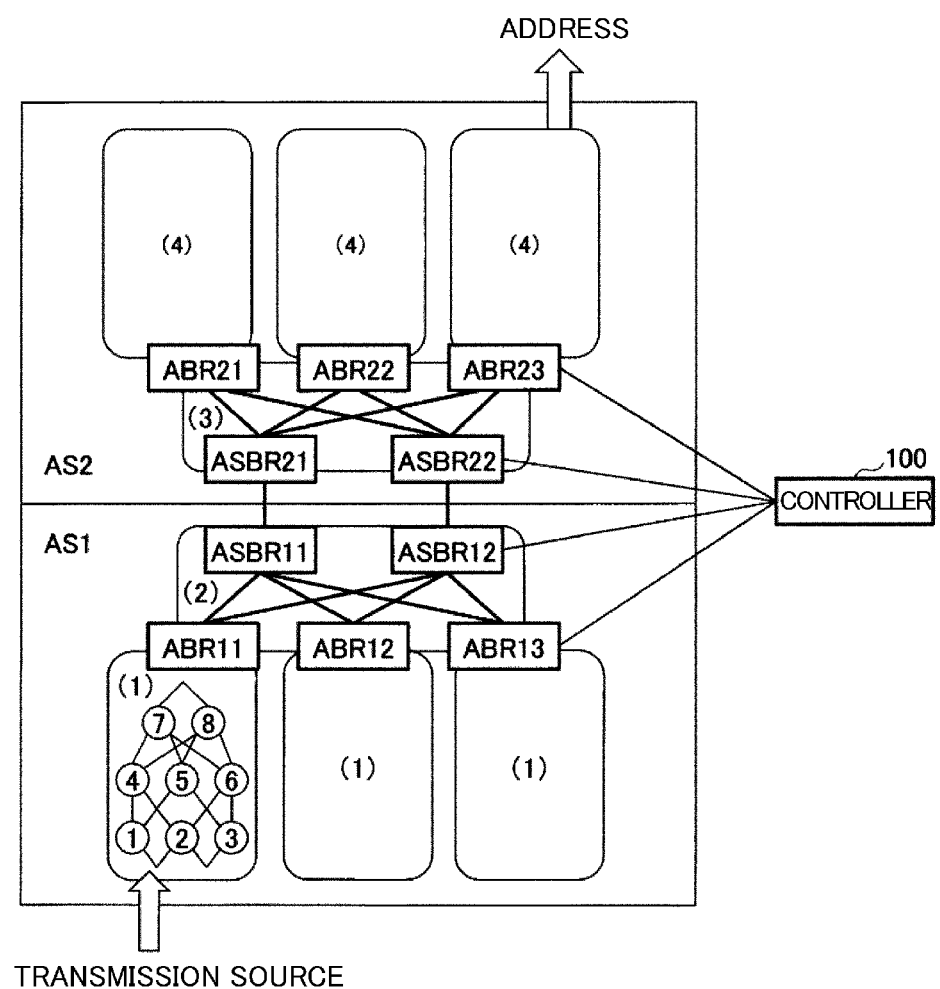
FIG. 2 is a diagram showing a logical configuration of a network in an embodiment of the present invention.

First, a logical configuration of a network for illustrating an embodiment of the present invention will be described with reference to FIG. 2. As shown in FIG. 2, a network is constituted by multiple communication apparatuses (hereinafter also referred to as routers, nodes, etc.). The network is divided into ASs (AS1, AS2, etc.), which are managed using an integrated operation policy. Routers (ASBR11, ASBR12, etc.) that are placed at boundaries between ASs and external networks are referred to as ASBRs (AS Boundary Routers). Also, the ASs can be managed divided into a backbone area and multiple sub-areas. Each sub-area is adjacent to the backbone area connecting the sub-areas, and routers (ABR11, ABR12, ABR13, etc.) that are placed at the borders between the backbone area and the sub-areas are called ABRs (Area Border Routers). That is, in FIG. 2, a sub-area of AS1 is indicated by (1), a backbone area of AS1 is indicated by (2), a backbone area of AS2 is indicated by (3), and a sub-area of AS2 is indicated by (4).

A control apparatus 100 called a controller can acquire NW information such as topology information from the ASBRs and ABRs, and can cause the ASBRs and ABRs to execute processing for designation (also called policies). In this manner, a router that can act as a peer to the controller 100 and can be controlled by the controller 100 is referred to as an anchor node. In the following embodiment, an example will be described in which the anchor nodes are ASBRs and ABRs. The anchor nodes are not limited to the ASBRs and the ABRs, and any communication apparatus in the network may be designated as an anchor node. Also, it is not necessary for all of the ASBRs and ABRs to be anchor nodes. The anchor nodes are designated in advance by an operation manager of the network. The controller 100 may also manage one AS, or may manage multiple ASs.

For example, it is envisioned that TE is performed in which the links to be passed through are designated individually in order to make changes in the link cost resulting from the occurrence of breakdown robust. For example, in the network shown in FIG. 2, in order to realize TE for passing through node 1→node 4→node 8→ASBR11→ASBR12 in the AS1 from an ASBR (not shown) that is an ingress router of the AS, five labels will be needed only in the AS1.

Figure 3:
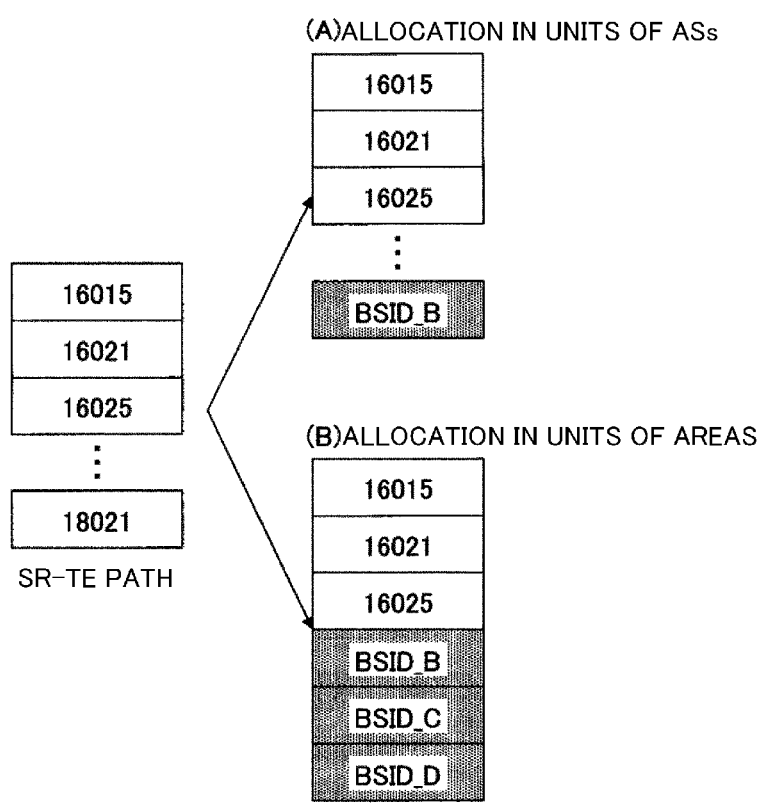
FIG. 3 is a diagram showing an overview of label compression.

Here, a scheme for replacing multiple SIDs (labels) with a single BSID (NPL 1, 2) will be considered with reference to FIG. 3.

First, a case is envisioned in which BSIDs are allocated in units of ASs. For example, in FIG. 2, the SIDs used in TE in the AS1 are compressed into BSID_A, and the SIDs used in TE in the AS2 are compressed into BSID_B. It is envisioned that the SIDs used in TE in the AS1 are <16015, 16021, 16025, . . . >, and the SID used in TE in the AS2 is <18021>. If the SID in the AS2 is compressed into BSID_B, as shown in FIG. 3(A), the labels that are pushed in the ingress router are <16015, 16021, 16025, . . . , BSID_B>. In this manner, with only TE in the AS1, many labels are needed and there is a possibility that the number of labels will exceed the processing limit of the router.

Next, it is envisioned that the BSIDs are allocated in units of areas. For example, the SIDs used in TE in the sub-areas (1) of AS1 in FIG. 2 are compressed into BSID_A, the SIDs used in TE in the backbone area (2) of AS1 are compressed into BSID_B, the SIDs used in TE in the backbone area (3) of AS2 are compressed into BSID_C, and the SIDs used in TE in the backbone area (4) of AS2 are compressed into BSID_D. In this case, although the number of labels from the ingress router to ABR11, which is the closest, can be reduced, as shown in FIG. 3(B), a number of BSIDs (BSID_B, BSID_C, BSID_D) corresponding to the number of areas is needed, and therefore there is a possibility that the number of labels will increase and exceed the processing limit of the router.

Accordingly, a label count reduction scheme according to which the processing limit of the router is not exceeded is needed.

Label Count Reduction Scheme

Figure 4:
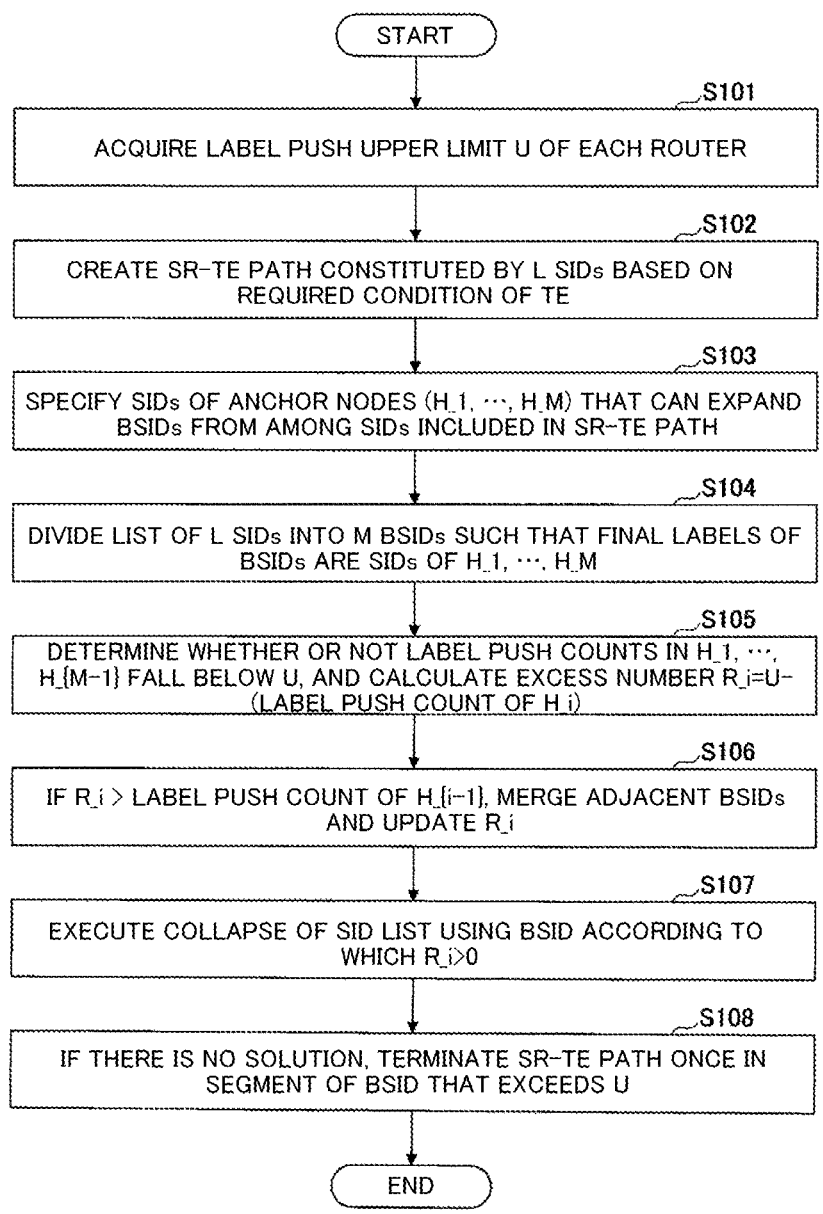
FIG. 4 is a flowchart showing a label count reduction scheme in an embodiment of the present invention.

A scheme in which a restriction is satisfied when route information constituted by L SIDs is provided (the node that satisfies an upper limit U (U<L) of the label push count and in which the BSID can be expanded being an anchor node) will be described with reference to FIG. 4. FIG. 4 is a flowchart showing a label count reduction scheme in an embodiment of the present invention. Note that in the following description, an example of an upper limit U of a label push count will be described as a restriction relating to the processing limit of the router, but the restriction relating to the processing limit of the router may also be the label stack count or the hop count.

In step S101, the controller 100 acquires the upper limit U of the label push count of each router.

The controller 100 acquires the topology information of each AS/area from the anchor nodes (ASBRs and ABRs) using a protocol such as BGP-LS (BGP-Link State). Information (Maximum SID Depth) on the number of pushable labels that are advertised in IGP is included in the topology information. The controller 100 determines the minimum value of the Maximum SID Depths of the routers in the network managed by the controller 100 as U. Note that U does not need to be determined uniquely in the network, and can also be determined for each area. If U is to be determined for each area, the controller 100 may determine the minimum value Ui of the area i for each area and use the minimum value Ui in the calculation of step S105. U may also be a value determined in advance based on the specification of the communication apparatus used in the network. Note that since U is the restriction condition of route control (SR), any value may be used, as long as it is in a range that does not exceed the processing limit of the communication apparatus on the route determined in step S102 below.

In step S102, the controller 100 creates route information (SR-TE path) that is constituted by L SIDs based on a required condition of TE.

The required condition is determined according to a user requirement, and examples thereof include a TE requirement such as delay and avoidance of a specific link, a service chaining requirement, and a target requirement. Based on the required condition, the controller 100 specifies SIDs of nodes, links, and peers to be passed through, and creates an SR-TE path.

The SIDs included in the SR-TE path may also be specified in real time based on information held by the controller 100. Anchor nodes such as ASBRs and ABRs are designated in advance. The controller 100 holds a correspondence relationship between the address of the ASBR and the AS number. Also, in step S101, the controller 100 holds SIDs (Node-IDs, Adj-SIDs, Peer-SIDs) acquired from the ASBR using a protocol such as BGP-LS. The controller 100 can create a list of SIDs constituting an SR-TE path using these SIDs.

In step S103, the controller 100 specifies the SIDs of the anchor nodes (H_1, . . . , H_M) that can expand BSIDs from among the SIDs constituting the SR-TE path.

Figure 5:
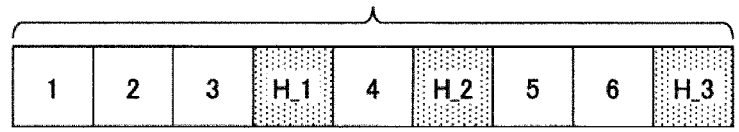
FIG. 5 is a diagram showing an overview of steps S103 and S104 of FIG. 4.
Figure 5:
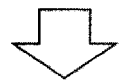
Figure 5:
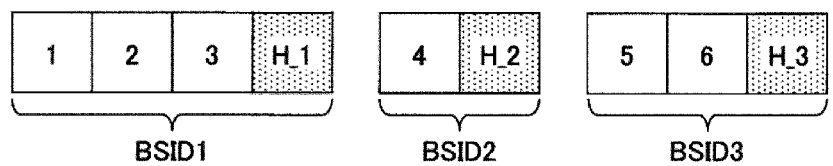

Here, among the SIDs constituting the SR-TE path generated in step S102, it is possible to specify the SIDs of the anchor nodes (H_1, . . . , H_M) that can expand BSIDs from the information acquired and stored by the controller 100 using a protocol such as BGP-LS, and information used for specifying the SIDs in step S102. FIG. 5(A) shows an example for when M=3 anchor nodes that can expand the BSIDs are specified from an SR-TE path constituted by L=9 SIDs.

In step S104, the controller 100 divides a list of L SIDs into M BSIDs such that the final label of each BSID is the SID of an anchor node (H_1, . . . , H_M).

Since the anchor node has a role of expanding the next BSID according to an instruction from the controller 100, the controller 100 divides the list of SIDs constituting the SR-TE path in units of anchor nodes (H_1, . . . , H_M). Specifically, when an SID included in the SR-TE path matches an SID of an anchor node, the controller 100 performs division immediately after that SID. Also, since it is understood that an ASBR serving as an anchor node is present when an SID included in the SR-TE path matches a Peer-SID, the controller 100 performs division immediately after that SID. The controller 100 sets a BSID for each divided path. FIG. 5(B) shows an example of when the list of SIDs constituting the SR-TE path is divided into M=3 BSIDs.

In step S105, the controller 100 determines whether or not the label push count in each anchor node ($H\_1, \ldots, H\_\{M-1\}$) falls below U, and calculates the excess number $R\_i=U-$(label push count of $H\_i$).

A portion of the list of SIDs can be compressed into a BSID by dividing the list of SIDs into BSIDs. The labels <1, 2, 3, H_1> obtained by performing division in FIG. 5(B) are compressed into BSID1, which can be expanded in the anchor node H_0, the labels <4, H_2> are compressed into BSID2, which can be expanded in the anchor node H_1, and the labels <5, 6, H_3> are compressed into BSID3, which can be expanded in the anchor node H_2. Note that since the labels <1, 2, 3, H_1> need to be expanded when transmitted from the anchor node H_0, <1, 2, 3, H_1> need not be compressed. If the label push count in each anchor node at this time is U or less, the following steps do not need to be executed.

Figure 6:
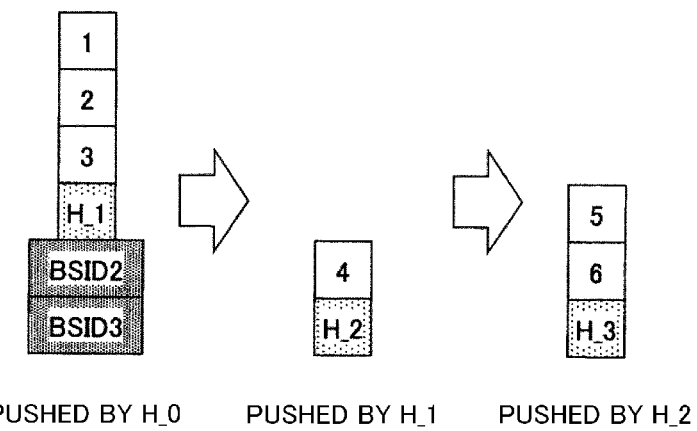
FIG. 6 is a diagram showing an overview of step S105 of FIG. 4.

The labels that are to be pushed by the anchor nodes H_0, H_1, and H_2 after the labels shown in FIG. 5(B) are compressed are shown in FIG. 6. As shown in FIG. 6, all of the SIDs of BSID1 and all of the BSIDs of BSID2 and onward need to be pushed by H_0, which is the ingress router. If it is assumed that U=5 holds true, the label push count for when BSID1 is expanded in H_0 is six, and the excess count R_0=1. In H_1, only BSID2 is expanded and <4, H_2> is pushed, and therefore the label push count is 2, and the excess count R_1=-3 is satisfied. In H_2, only BSID3 is expanded and <5, 6, H_3> is pushed, and therefore the label push count is 3 and the excess count R_2=-2 is satisfied.

In step S106, in the case where R_i> the label push count of H_1 is satisfied, the controller 100 reduces the number of BSIDs by merging adjacent BSIDs. Note that the label push count resulting from merging needs to be U or less. The controller 100 updates R_i after the BSIDs are merged.

Figure 7:
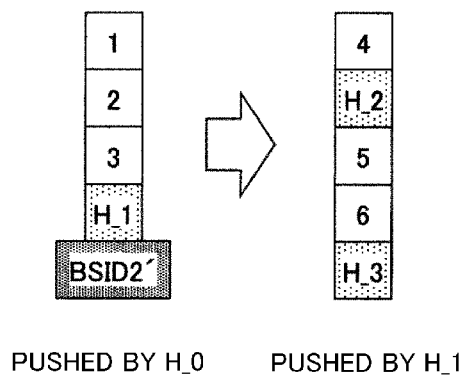
FIG. 7 is a diagram showing an overview of step S106 of FIG. 4.

If it is envisioned that the labels <4, H_2> that are pushed by H_1 and the labels <5, 6, H_3> that are pushed by H_2 in FIG. 6 are merged together, the label push count resulting from merging will be 2+3=5, which is U or less. That is, BSID2 and BSID3 can be merged into a new BSID2'. The labels that are pushed by the anchor nodes H_0 and H_1 when merging has been performed in this manner are shown in FIG. 7. As shown in FIG. 7, the labels pushed by H_0 are reduced to <1, 2, 3, H_1, BSID2'>, the label push count is 5, and the excess number R_0=0 is satisfied. The labels pushed by H_1 are <4, H_2, 5, 6, H_3>, the label push count is 5, and the excess number R_1=0 is satisfied.

In step S107, the controller 100 executes collapsing of the list of SIDs using a BSID in which R_i>0 is satisfied.

Figure 8:
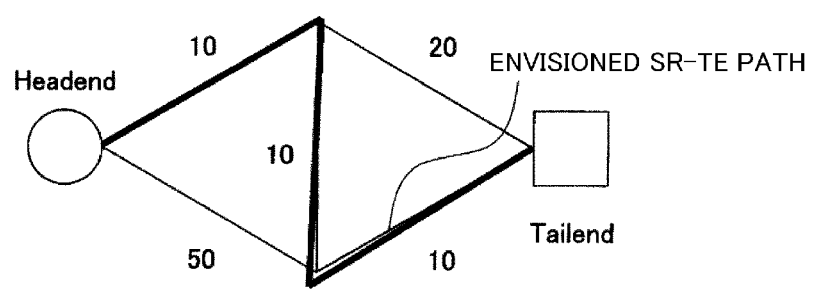
FIG. 8 is a diagram showing an overview of step S107 of FIG. 4.

An existing technique (NPL 3, 4) can be used for the collapsing of the list of SIDs. Specifically, it is possible to confirm whether or not it is possible to replace some of the paths in the list of SIDs with Node-IDs serving as endpoints, and if replacement is possible, the list of SIDs can be collapsed. For example, it is envisioned that three Adj-SIDs have been used to designate a link for passing from a Headend node to a Tailend node shown in FIG. 8. The numbers near the links in FIG. 8 indicate the cost. In this example, the path from the Headend node to the Tailend node is the shortest path, and therefore the three Adj-SIDs can be replaced with the one Node-ID of the Tailend node.

In step S108, if there is no solution in step S107 above (i.e., if R_i>0 is satisfied), the controller 100 prevents the upper limit of the label push count from being exceeded by terminating the SR-TE path once in the segment of the BSID that exceeds the upper limit U of the label push count.

Figure 9:
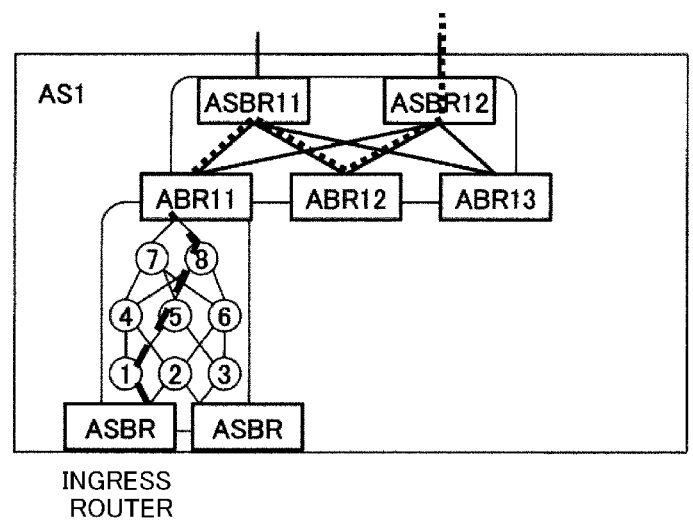
FIG. 9 is a diagram showing an overview of step S108 of FIG. 4.

For example, as shown in FIG. 9, if TE is performed by providing many labels in a sub-area including an ingress router, there is a possibility that the label push count will exceed the upper limit of the router when a BSID for routing from a backbone and onward is provided. In this case, the SR-TE path is terminated at the ABR that is to be first passed through, and the controller 100 once again pushes a label using the ABR at which SR-TE path was terminated as the new Headend.

Alternatively, the controller 100 may also redefine the list of BSIDs that were compressed for each anchor node as a new BSID. For example, by redefining BSID2 and BSID3 in FIG. 6 as the new BSID2', the number of labels pushed by H_0 in FIG. 6 is reduced to 5. In this case, the controller 100 expands the BSID2' to BSID2 and BSID3 in H_1, and furthermore expands the BSID2 to <4, H_2>.

After the labels are compressed according to the above-described procedure, the controller 100 uses a protocol such as PCEP (Path Computation Element Protocol) or Netconf to distribute the SR policy (information for expanding the SR-TE path and the BSIDs included in the SR-TE path) to the anchor nodes on the route.

Functional Configuration of Controller

Figure 10:
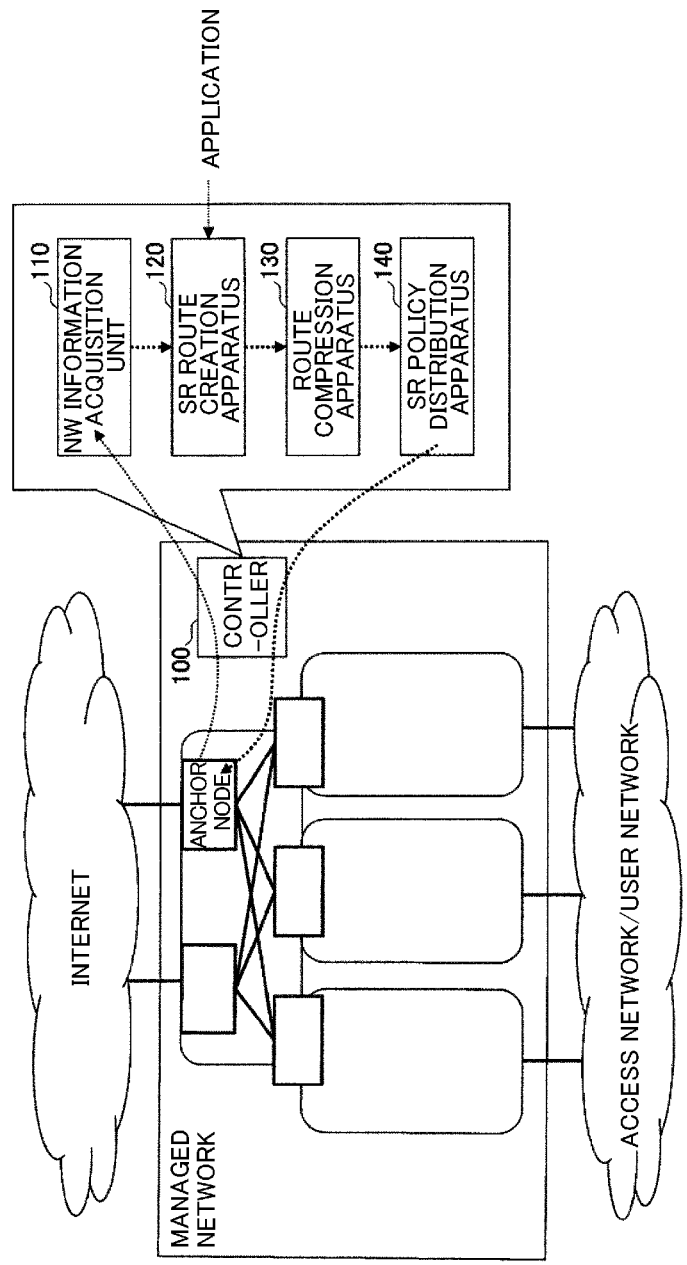
FIG. 10 is a diagram showing a configuration of a controller in an embodiment of the present invention.

FIG. 10 shows a configuration of the controller 100 according to an embodiment of the present invention. The controller 100 is a group of apparatuses that manage the network described with reference to FIG. 2. A network managed by the controller 100 is called a managed network. The managed network is, for example, a large-scale SR-MPLS network that connects the Internet, such as an ISP (Internet Service Provider) network, and an access network/user network. The controller 100 includes an NW information acquisition apparatus 110, an SR route creation apparatus 120, a route compression apparatus 130, and an SR policy distribution apparatus 140. Note that the controller 100 may also be configured as a control apparatus including some functions of the above-described apparatus group.

The NW information acquisition apparatus 110 acquires NW information such as topology information from anchor nodes and the like in the managed network. The SR route creation apparatus 120 creates route information to be distributed as an SR policy based on the NW information acquired by the NW information acquisition apparatus 110 and a required condition from an application. This route information is obtained by expressing labels of communication apparatuses or links through which to pass in the form of a list of SIDs. The route compression apparatus 130 compresses labels of route information created by the SR route creation apparatus 120 into a BSID. The compression of the labels is performed in accordance with the flowchart shown in FIG. 4. The SR policy distribution apparatus 140 distributes the route information and information for expanding the BSID to the anchor nodes on the route as an SR policy.

Figure 11:
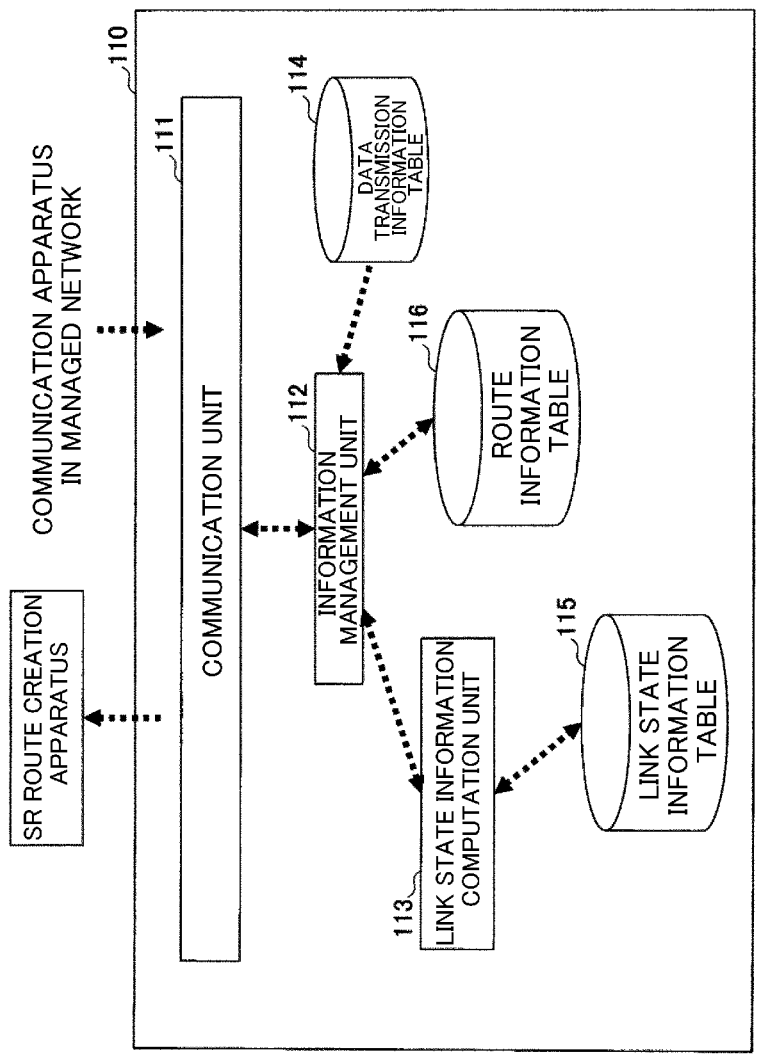
FIG. 11 is a diagram showing an example of an NW information acquisition apparatus.

FIG. 11 is a diagram showing an example of the NW information acquisition apparatus 110. The NW information acquisition apparatus 110 includes a communication unit 111, an information management unit 112, a link state information computation unit 113, a data transmission information table 114, a link state information table 115, and a route information table 116.

FIG. 12 shows an example of the data transmission information table 114. Information relating to data transmission, such as the range of data transmitted to the SR route creation apparatus 120 (transmission data range) and the interval of the data to be transmitted (data transmission interval), is stored in the data transmission information table 114. The transmission data range is used for determining the information to be stored in the link state information table 115 and the route information table 116.

FIG. 13 shows an example of the link state information table 115. The link state information table 115 stores information obtained by processing the link state information acquired using a protocol such as BGP-LS. The label information is an SID. Topology information of the managed network is stored in the link state information table 115 using the SID as a key. For example, for each SID, the type, Local index, and link state information (information on the connection destination, etc.) of the SID are stored in the link state information table 115. If the SID is an Adj-SID or a Peer-SID indicating a link, the link state information is processed into information such as a link usage rate.

FIG. 14 shows an example of the route information table 116. Route information of BGP, IP, or the like is stored in the route information table 116. For example, information on the network information in the AS obtained by the router through BGP and the router address is stored. Since it is envisioned that the amount of information of the route information table 116 will increase, information including changes from the prior instance may also be stored based on the information on the BGP table and the IP route table included in the controller 100.

The information management unit 112 uses a protocol such as BGP-LS to acquire link state information of an IGP and route information of BGP, IP, or the like from a communication apparatus in the managed network via the communication unit 111. The communication apparatuses from which the link state information and the route information are acquired are mainly anchor nodes, but the information may also be acquired from other communication apparatuses. Here, the Maximum SID Depth advertised in the IGP is acquired, and the upper limit U of the label push count is determined. The upper limit U of the label push count is transmitted to a later-described route compression apparatus 130 and is stored in the compressed information table 135. The information management unit 112 performs computation such as sorting in which the label information is used as a key, and thereafter stores the acquired link state information and route information in the link state information table 115 and the route information table 116. Note that when the link state information is stored in the link state information table 115, the link state information computation unit 113 performs computation of the link usage rate or the like, and thereafter stores the link state information in the link state information table 115 in a predetermined format. The information management unit 112 determines the transmission interval and the data content to be transmitted based on the data transmission information table 114, and transmits the data in the link state information table 115 and the route information table 116 to the SR route creation information 120 via the communication unit 111. At this time, the information management unit 112 may also transmit all of the information every time to the SR route creation apparatus 120 in accordance with the content of the data transmission information table 114, and may also transmit only information indicating a difference from the previous instance of transmission.

Figure 15:
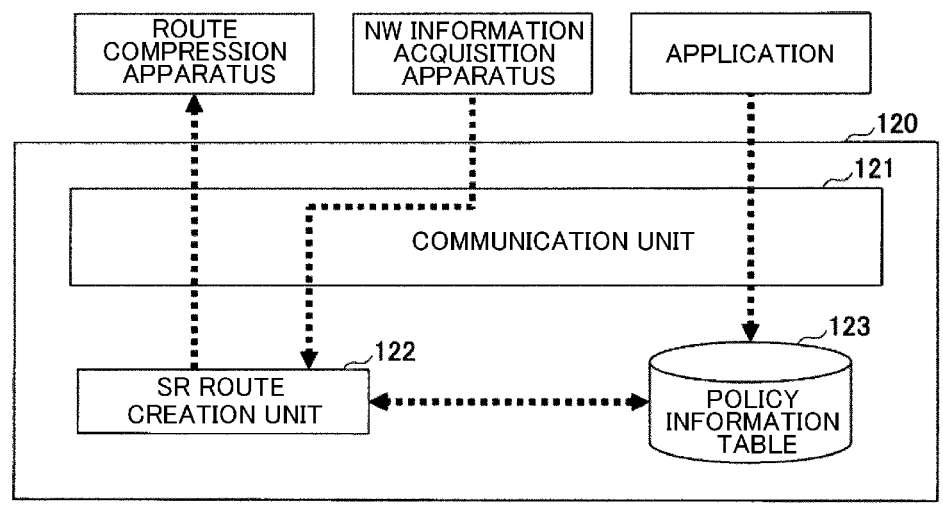
FIG. 15 is a diagram showing an example of an SR route creation apparatus.

FIG. 15 is a diagram showing an example of the SR route creation apparatus 120. The SR route creation apparatus 120 includes a communication unit 121, an SR route creation unit 122, and a policy information table 123.

FIG. 16 shows an example of the policy information table 123. A routing policy for satisfying a required condition on the application side is stored in the policy information table 123. For example, policy 1 is a policy that is to be used when traffic bypasses a specific security apparatus.

The SR route creation unit 122 determines the route information of SR based on the policy information determined by the application (designation of nodes through which to pass, or the like, avoidance of a specific link, etc.), and the NW information received at a certain interval from the NW information acquisition apparatus 110 via the communication unit 121. This corresponds to step S102 of FIG. 4. The route information of SR is designated by the nodes through which to pass and the labels of the link. The SR route creation unit 122 transmits the route information to the route compression apparatus 130 via the communication unit 121.

Figure 17:
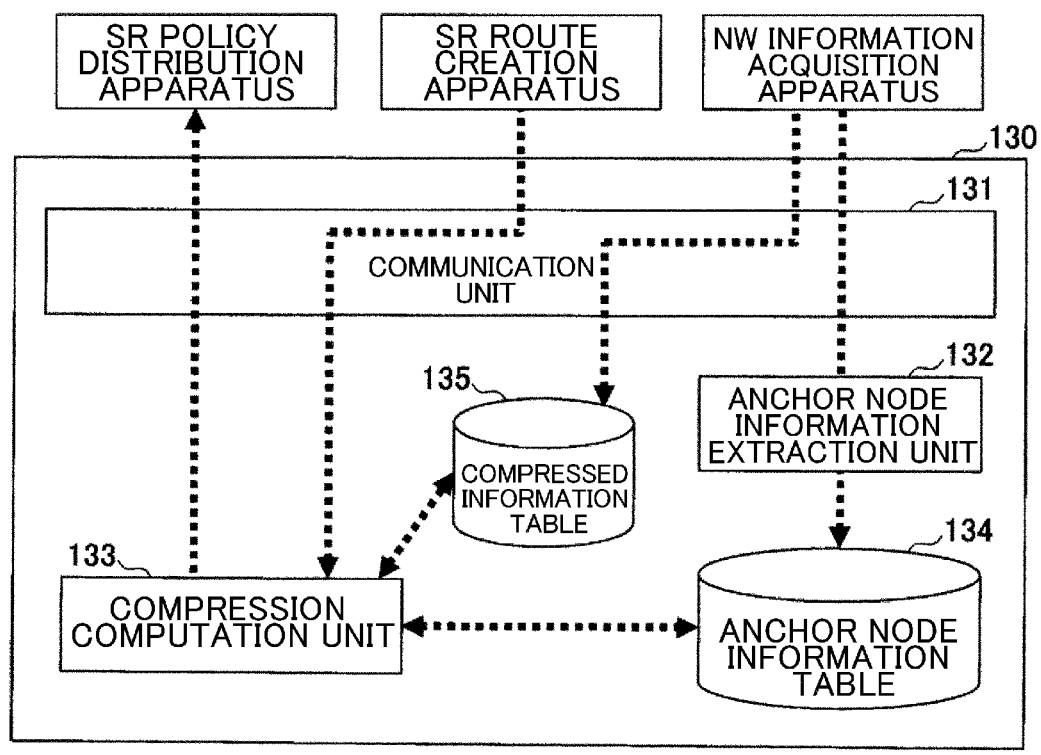
FIG. 17 is a diagram showing an example of a route compression apparatus.

FIG. 17 is a diagram showing an example of the route compression apparatus 130. The route compression apparatus 130 includes a communication unit 131, an anchor node information extraction unit 132, a compression computation unit 133, an anchor node information table 134, and a compressed information table 135.

FIG. 18 shows an example of the anchor node information table 134. As shown in FIG. 18, for each anchor node, the related label information SID is obtained, no matter the type of the label, such as Node-ID or Peer-SID.

The anchor nodes are designated in advance, and the anchor node information extraction unit 132 acquires information such as the BGP table from the NW information acquisition apparatus 110 via the communication unit 131, extracts information on the predesignated anchor nodes from the acquired information, and stores the extracted information in the anchor node information table 134.

The compression computation unit 133 acquires the route information of SR from the SR route creation apparatus 120 via the communication unit 131. The compression computation unit 133 divides the labels included in the route information in units of anchor nodes. At this time, the label information of the anchor nodes that can expand the BSIDs is acquired from the anchor node information table 134 and division of the route information is performed. This corresponds to steps S103 and S104 of FIG. 4. The compression computation unit 133 compresses the labels included in the route information into a BSID so as not to exceed the processing limit in the communication apparatus on the route. Note that the compression computation unit 133 uses the upper limit U of the label push count stored in the compressed information table 135 as the processing limit. This corresponds to steps S105 and S106 of FIG. 4. At this time, the compression computation unit 133 may also merge the compressed labels without exceeding the processing limit in the communication apparatus on the route. This corresponds to step S106 of FIG. 4. Also, the compression computation unit 133 may replace several labels in the route information with Node-IDs equivalent to these labels. This processing may also be performed by transmitting information on a segment in which the upper limit U of the label push count is exceeded to the SR route creation apparatus 120 and by the compression computation unit 133 acquiring the corrected route information in the SR route creation apparatus 120. This corresponds to step S107 of FIG. 4. Furthermore, the compression calculation unit 133 may also terminate the route at any anchor node so as not to exceed the processing limit in the communication apparatuses on the route. This corresponds to step S108 of FIG. 4. The compression computation unit 133 transmits the compressed route information to the SR policy distribution apparatus 140 via the communication unit 131.

Figure 19:
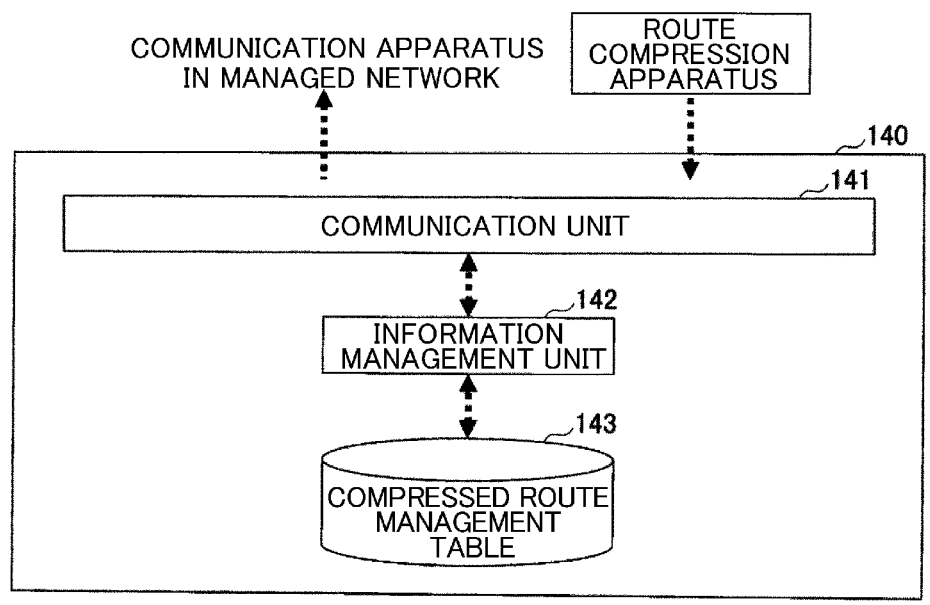
FIG. 19 is a diagram showing an example of an SR policy distribution apparatus.

FIG. 19 is a diagram showing an example of the SR policy distribution apparatus 140. The SR policy distribution apparatus 140 includes a communication unit 141, an information management unit 142, and a compressed route management table 143.

FIG. 20 shows an example of the compressed route management table 143. The result (SR policy) of route control that is to be performed by the SR route creation apparatus 120 for each required condition (policy) received from the application is stored in the compressed route management table 143. The route information of the SR policy is in the form of an SID list. The compressed route management table 143 stores a BSID obtained by compressing the labels present in this SID list, and the compressed route management table 143 holds the content of the BSID and information on anchor nodes that expand the BSID.

The information management unit 142 acquires compressed route information from the route compression apparatus 130 via the compression unit 141 and stores the acquired route information in the compressed route management table 143. The information management unit 142 transmits the SID list of the compressed route management table 143 to the ingress router and distributes the content of the BSID to the relevant anchor node via the communication unit 141. For example, in the case of SR policy 2, the information management unit 142 transmits the SID list of the route to the ingress router, distributes the information <10, 20, 30> for expanding the BSID:100 to the router A, and distributes the information <16005> for expanding the BSID:200 to the router B. If the BSIDs have been merged into BSID', the information management unit 142 distributes the information for expanding the BSID' to the corresponding anchor node. For example, in the case of SR policy 2', the information management unit 142 distributes the information <10, 20, 30, 16005> for expanding the BSID':100 to the router A. Note that when the route is terminated partway, the information management unit 142 transmits the new route information to the anchor node that terminated the route via the communication unit 141. A communication protocol such as PCEP can be used as the method for distributing the route.

Figure 21:
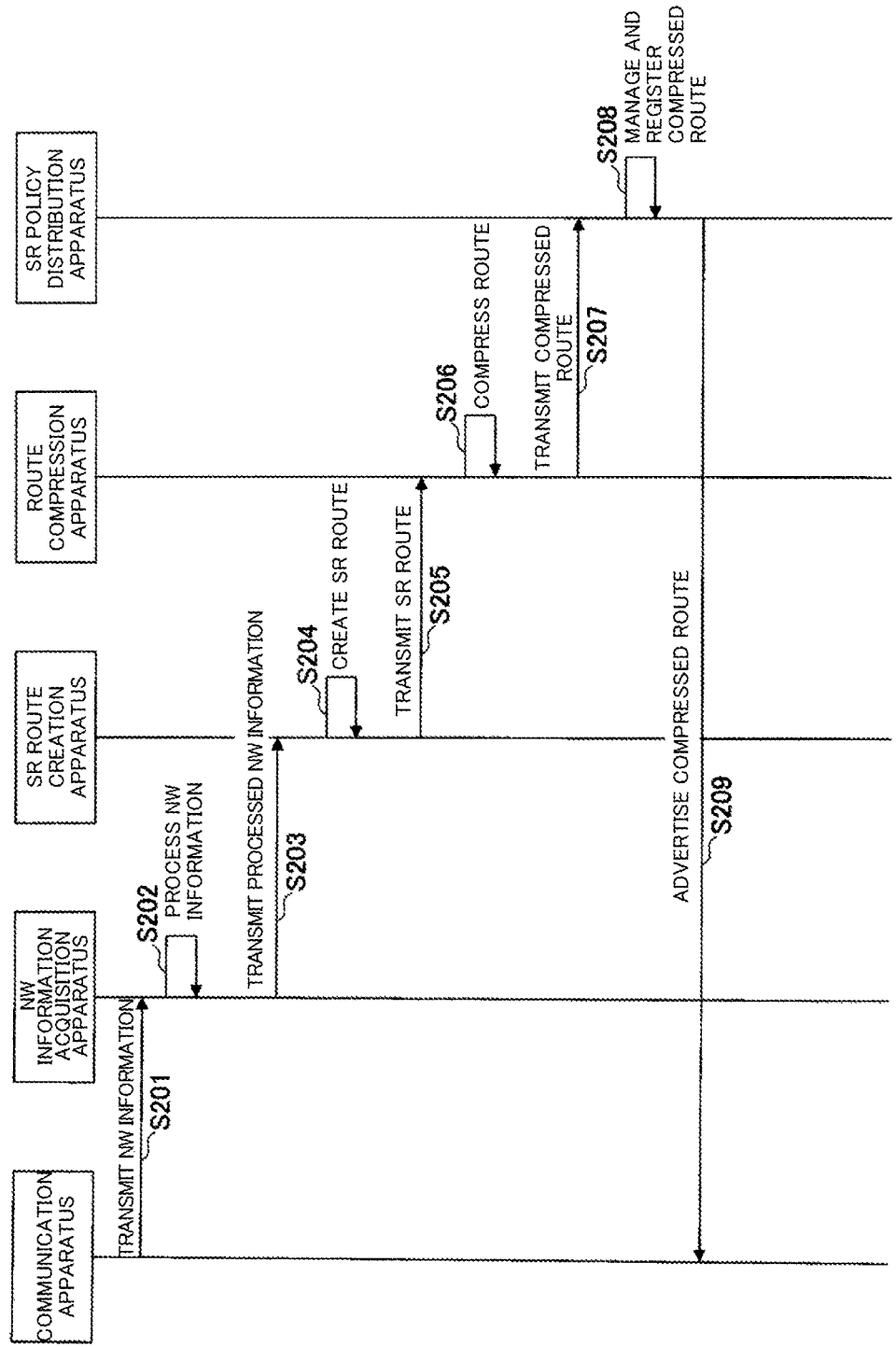
FIG. 21 is a sequence diagram showing processing of a controller.

FIG. 21 is a sequence diagram showing processing of the controller 100.

In step S201, the NW information acquisition apparatus 110 acquires the NW information such as the topology information from a communication apparatus in the managed network. In step S202, the NW information acquisition apparatus 110 processes the acquired NW information and transmits the result to the SR route creation apparatus 120 in step S203. In step S204, the SR route creation apparatus 120 creates the route information of SR taking into account a requirement from an application and NW information, and transmits the result to the route compression apparatus 130 in step S205. In step S206, the route compression apparatus 130 creates a BSID by specifying the SIDs of the anchor nodes from among the SIDs included in the candidate routes and dividing the SIDs. Thereafter, the route compression apparatus 130 determines whether or not the processing limit of the router is exceeded during transmission through BSID, and performs merging of the BSIDs and review of the route information according to the determination result. In step S207, the route compression apparatus 130 transmits the compressed route to the SR policy distribution apparatus 140. In step S208, the SR policy distribution apparatus 140 registers the compressed route and transmits the compressed route to the communication apparatus in step S209.

Result of Embodiment

As described above, according to the embodiment of the present invention, a router that is suitable for expansion of the BSID can be selected from among the routers (anchor nodes) that can expand the BSID, and the number of labels that have been expanded can be suppressed to the processing limit of the router or less. In the method of the embodiment of the present invention, after dividing segments in units of anchor nodes into BSIDs, merging can be performed in view of an insufficient state of the label count. This makes it possible to determine which router is to be set as an anchor node. Also, the number of instances of terminating the SR-TE path can be reduced.

Also, since the label count can be reduced, flexible TE can be realized also in an environment in which many labels are required while the load on a router and overhead are suppressed.

Figure 22:
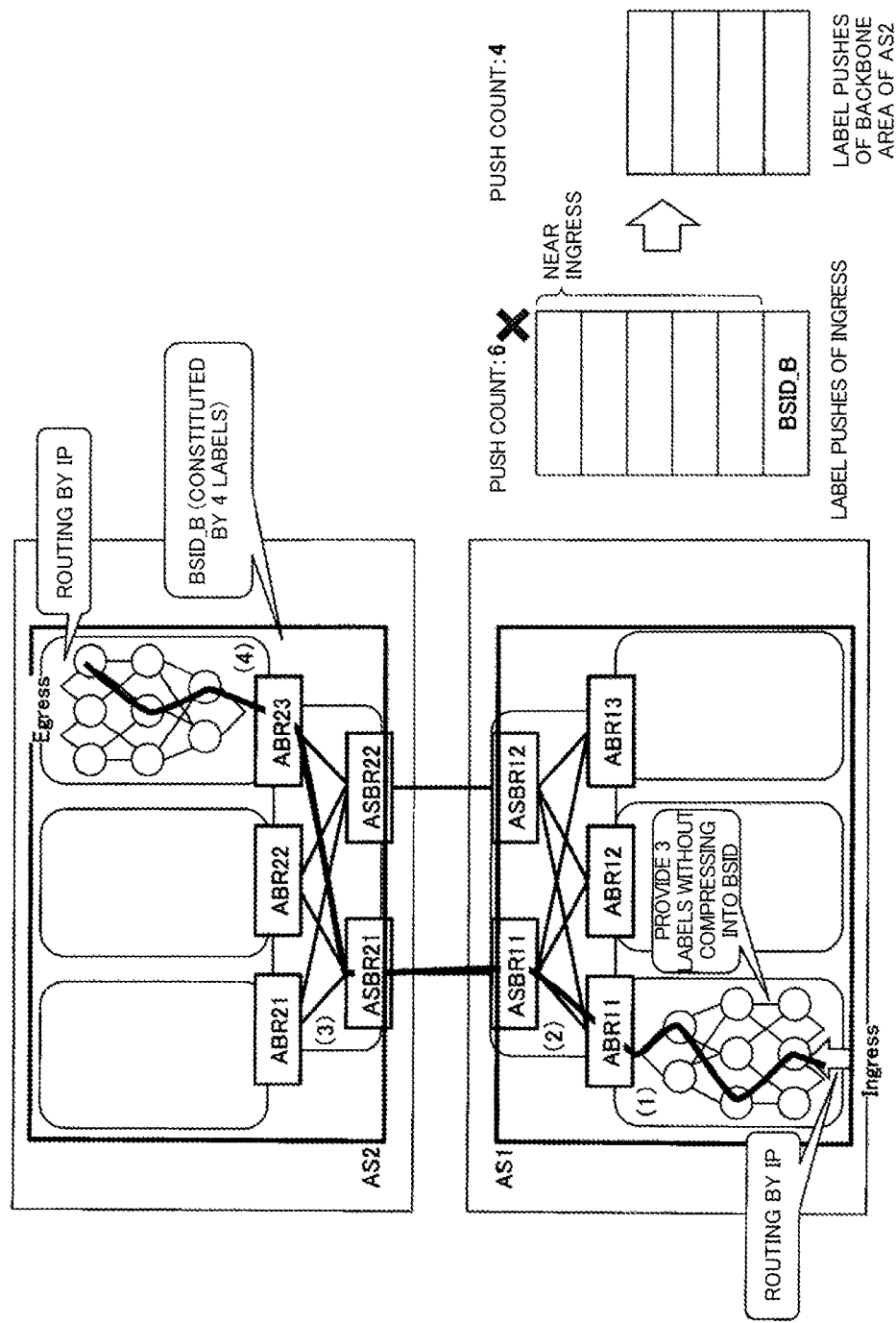
FIG. 22 is a diagram showing effectiveness of an embodiment when constituted by two ASs (a diagram showing a problem to be solved regarding allocation in units of ASs).
Figure 23:
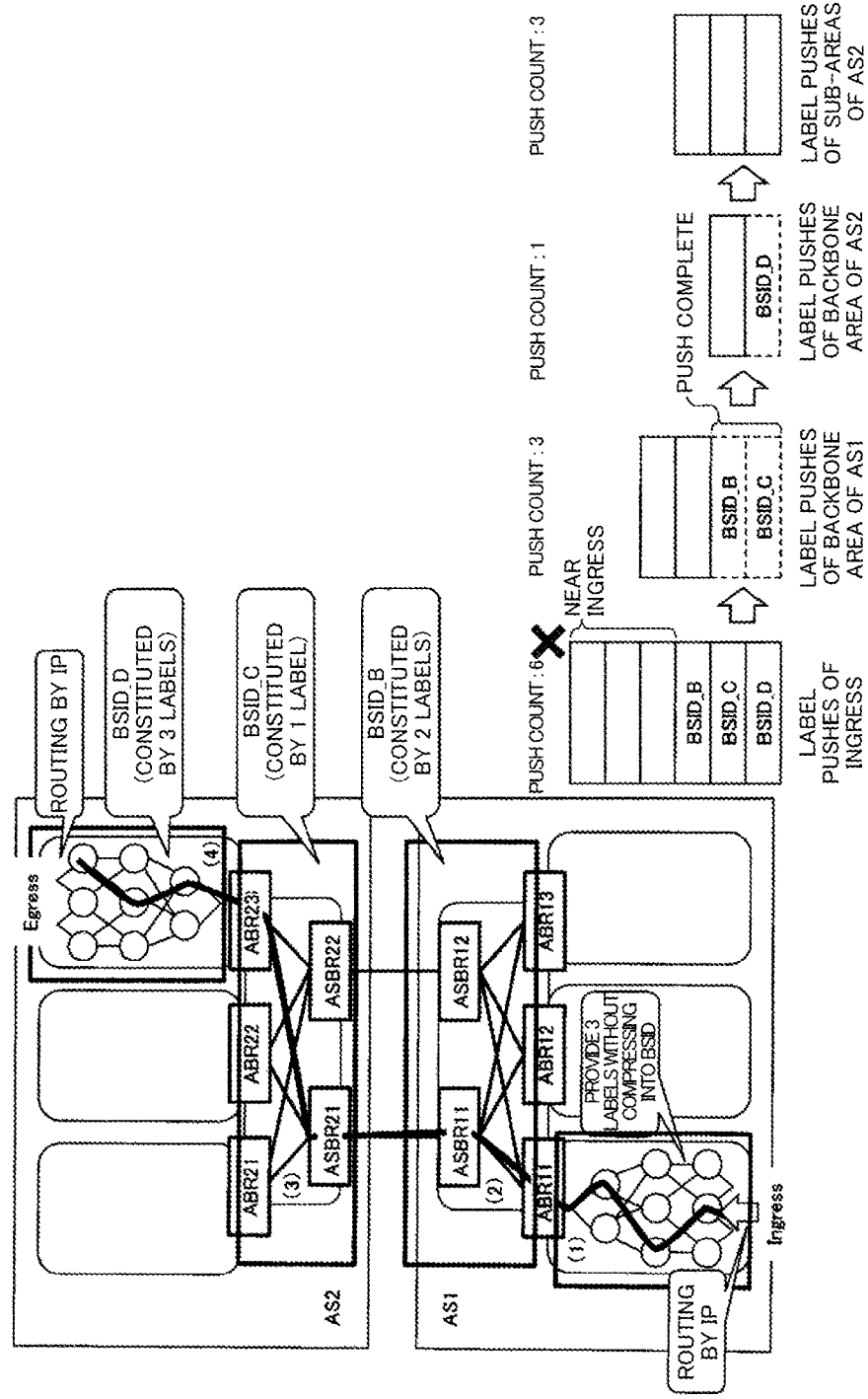
FIG. 23 is a diagram showing effectiveness of an embodiment when constituted by two ASs (a diagram showing a problem to be solved regarding allocation in units of areas).
Figure 24:
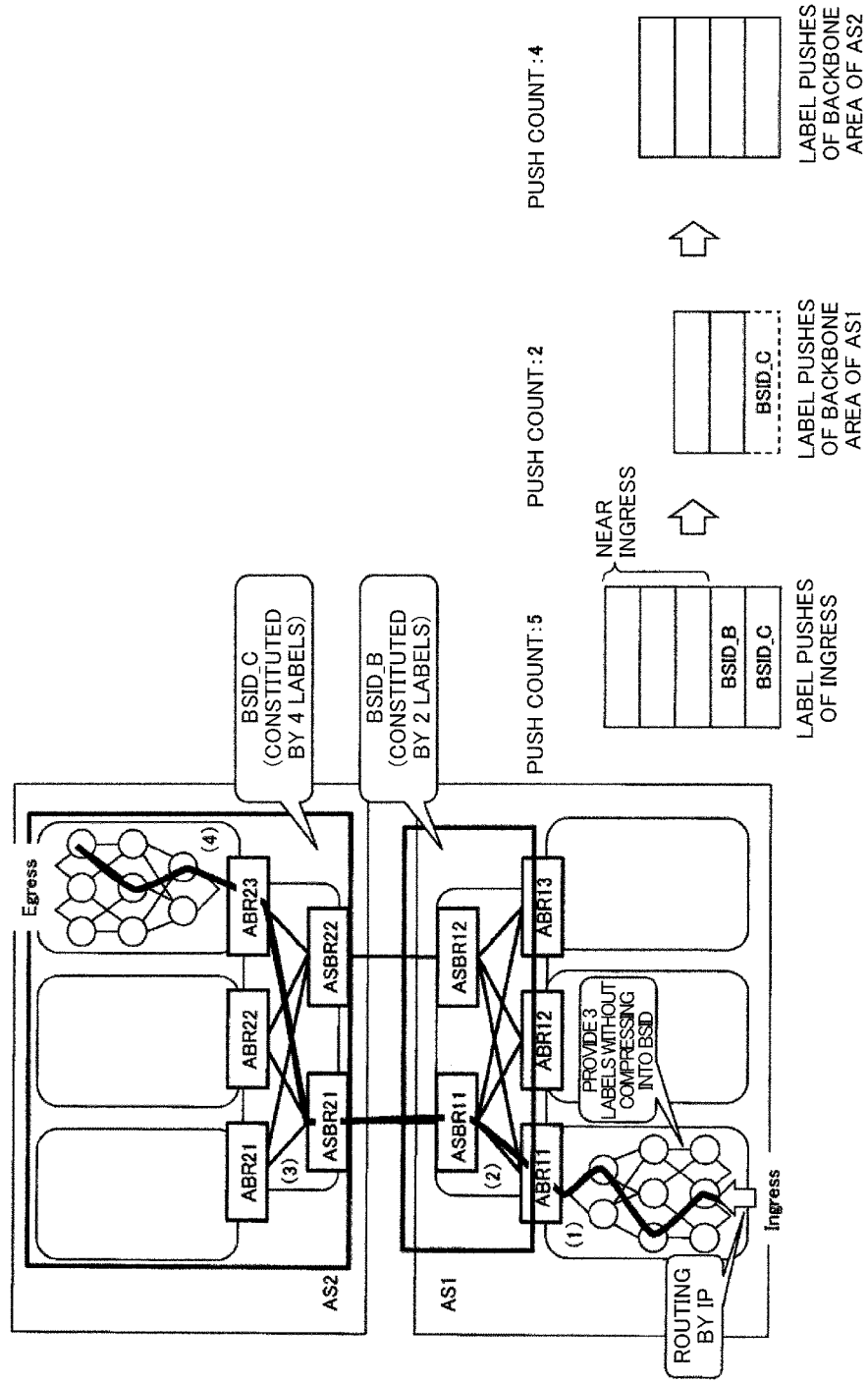
FIG. 24 is a diagram showing effectiveness of an embodiment when constituted by two ASs.

FIGS. 22 to 24 are diagrams showing the effectiveness of the embodiment when constituted by two ASs. Here, it is envisioned that U=5 is satisfied, and three labels are needed in the sub-areas (1) of the AS1.

If the BSIDs are allocated in units of ASs as shown in FIG. 22, the ASBR21 is an anchor node that expands the BSID. In this case, although there is a low number of BSIDs, there is a possibility that the number of SIDs subjected to Ingress pushing will increase and the label push count in Ingress will exceed the upper limit U. Also, if the NW in the AS is large, there is even a possibility that the label push count will exceed the upper limit U with only routing in the AS.

As shown in FIG. 23, if the BSIDs are allocated in units of areas, the ABR11, ASBR21, and ABR23 are anchor nodes that expand the BSIDs. In this case, although the number of SIDs that are pushed in the Ingress is low, there is a possibility that the number of BSIDs will increase accompanying the increase in the number of areas, and therefore the label push count in Ingress will exceed the upper limit U.

As shown in FIG. 24, in the embodiment of the present invention, instead of a fixed allocation in units of ASs or in units of areas, it is possible to select anchor nodes that are suitable for expansion of the BSIDs, in which the BSIDs are minimized while satisfying an upper limit of the number of pushable labels. Here, ABR11 and ASBR21 are the anchor nodes that expand the BSIDs. Since the number of labels that can be designated corresponds to the number of BSIDs saved through merging of the BSIDs, flexible route control can be realized in the entire network.

Figure 25:
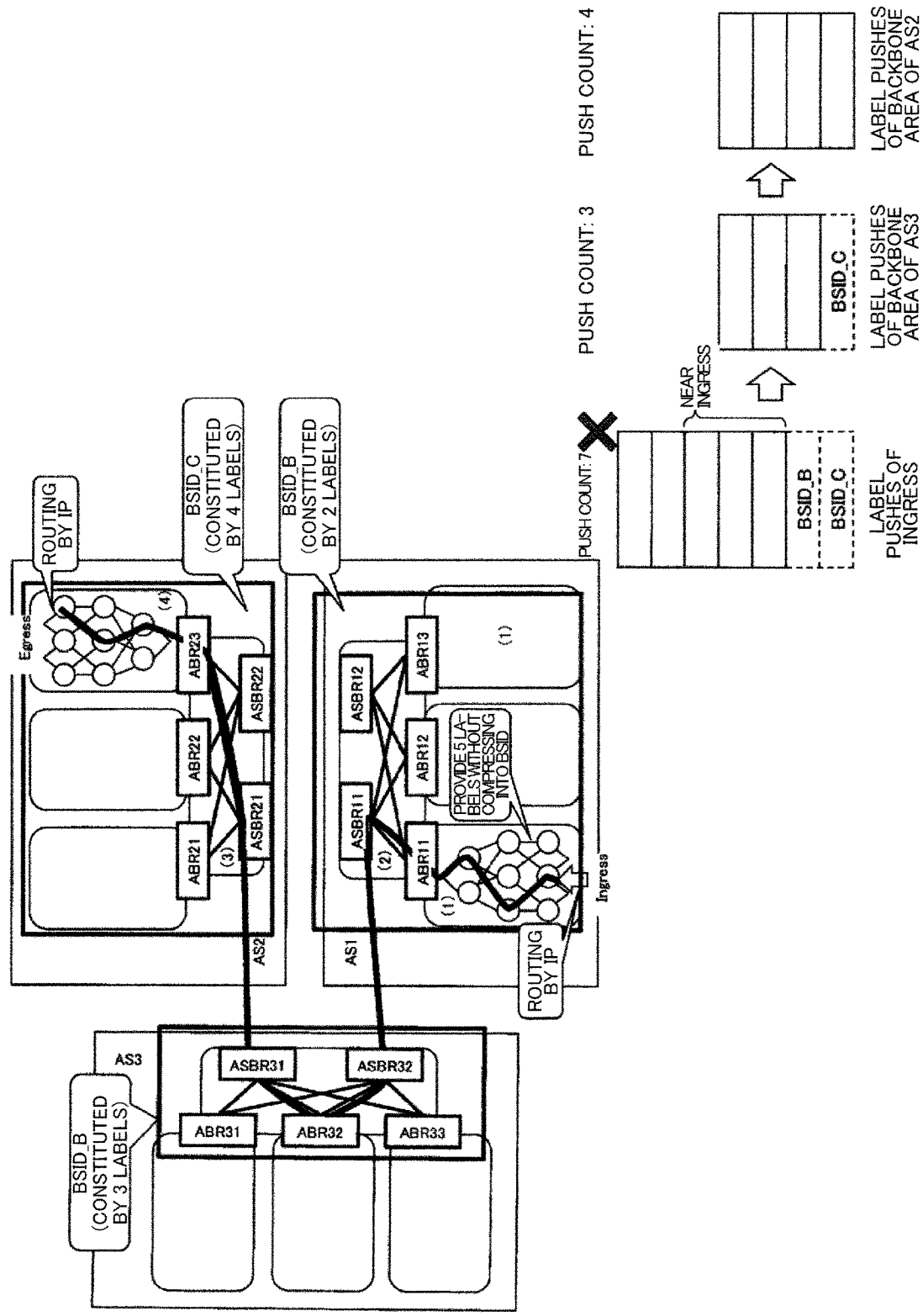
FIG. 25 is a diagram showing effectiveness of an embodiment when constituted by three ASs (a diagram showing a problem to be solved regarding allocation in units of ASs).
Figure 26:
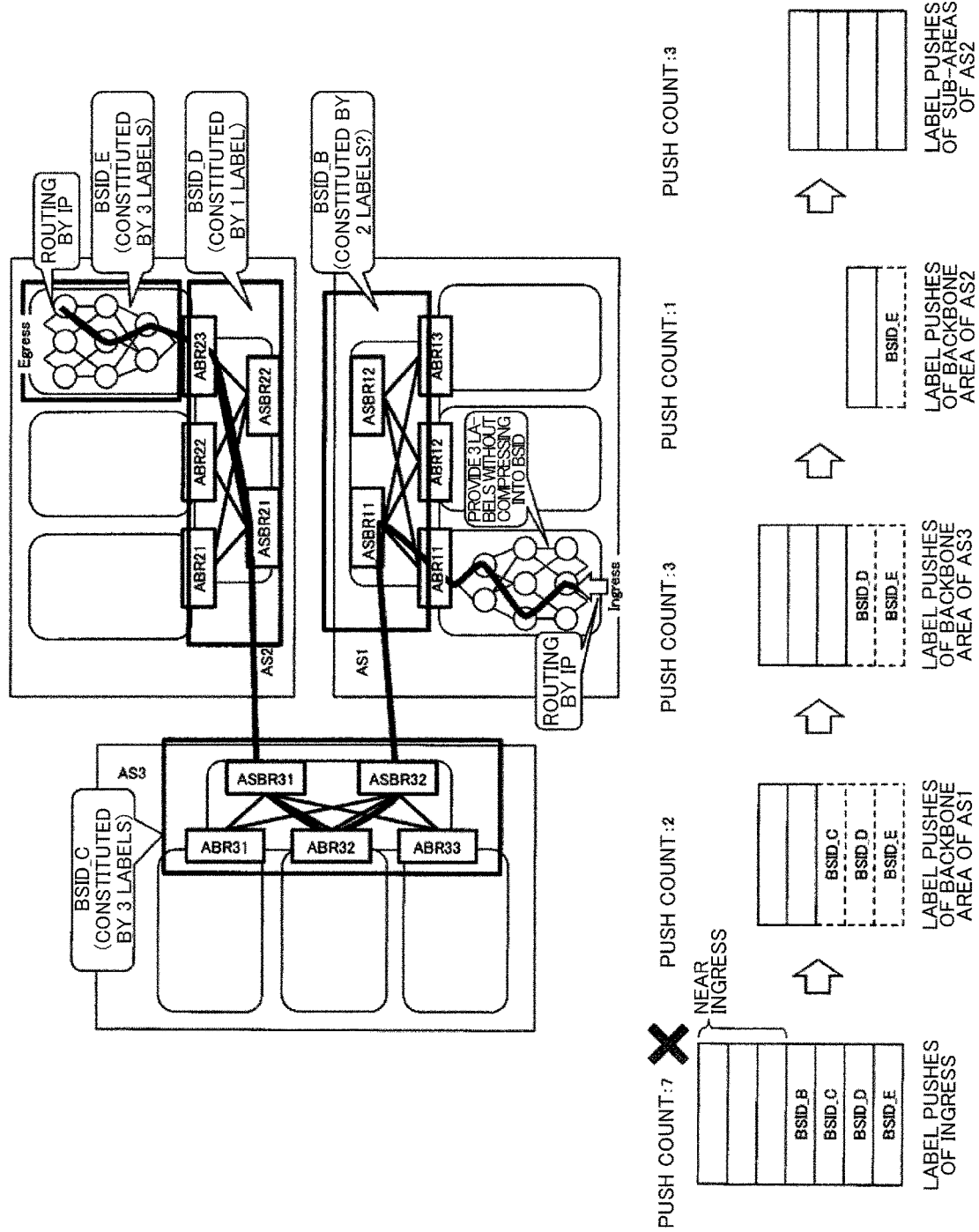
FIG. 26 is a diagram showing effectiveness of an embodiment when constituted by three ASs (a diagram showing a problem to be solved regarding allocation in units of areas).

FIGS. 25 and 26 are diagrams showing the effectiveness of the embodiment when constituted by three ASs. Here, it is envisioned that U=5 is satisfied, and three labels are needed in the sub-areas (1) of the AS1.

If the BSIDs are allocated in units of ASs as shown in FIG. 25, the ASBR32 and ASBR21 are the anchor nodes that expand the BSIDs. In this case, although there is a low number of BSIDS, there is a possibility that the number of SIDs subjected to Ingress pushing will increase and the label push count in Ingress will exceed the upper limit U. Also, if the NW in the AS is large, there is even a possibility that the label push count will exceed the upper limit U with only routing in the AS.

As shown in FIG. 26, if the BSIDs are allocated in units of areas, ABR11, ASBR32, ASBR21, and ABR23 are anchor nodes that expand the BSIDs. In this case, although the number of SIDs that are pushed in Ingress is low, there is a possibility that the number of BSIDs will increase accompanying the increase in the number of areas, and therefore the label push count in Ingress will exceed the upper limit U.

Figure 27:
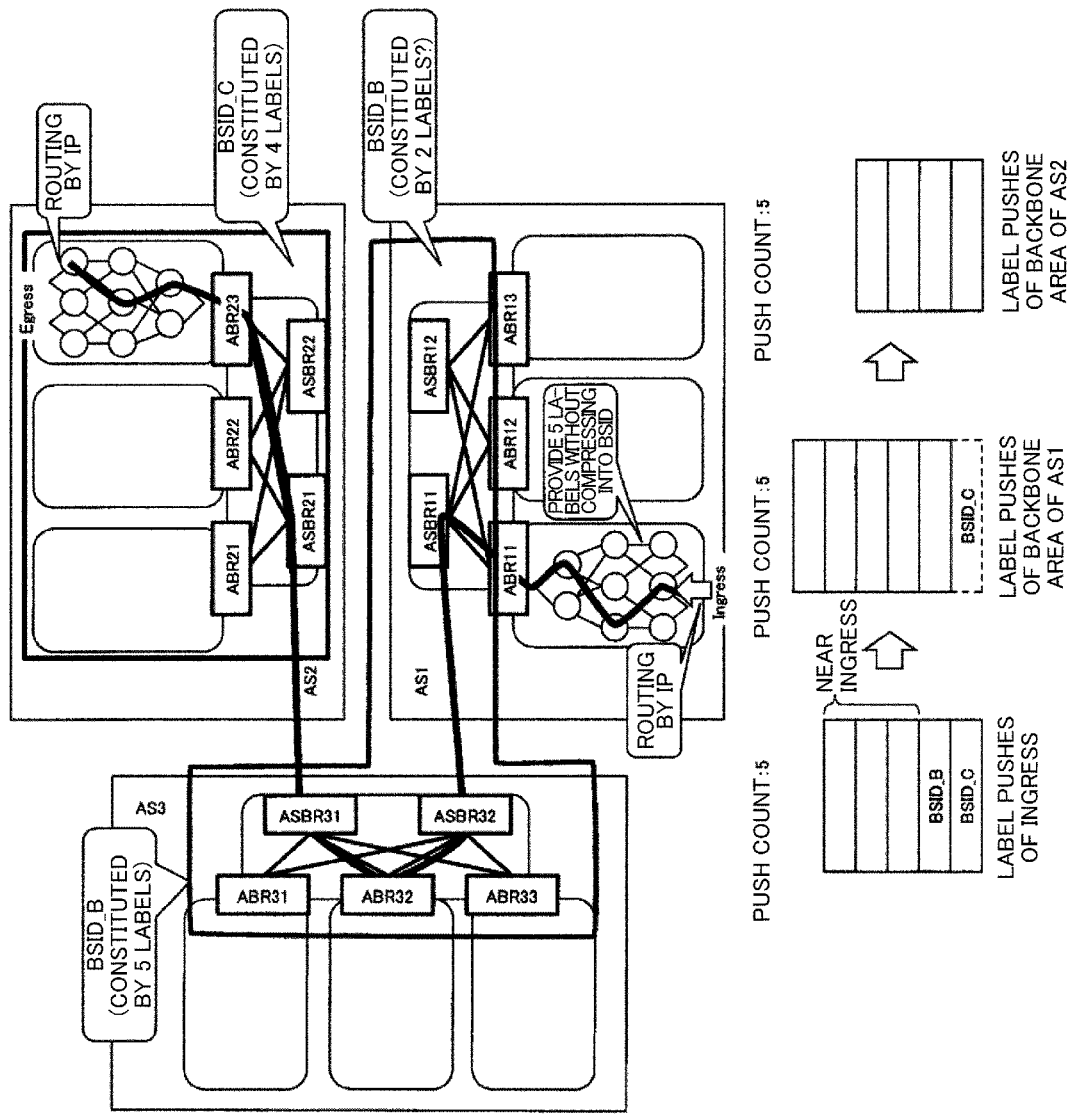
FIG. 27 is a diagram showing effectiveness of an embodiment when constituted by three ASs.

As shown in FIG. 27, in the embodiment of the present invention, instead of a fixed allocation in units of ASs or in units of areas, it is possible to select anchor nodes that are suitable for expansion of the BSIDs, in which the BSIDs are minimized while satisfying an upper limit of the number of pushable labels. Here, ABR11 and ASBR21 are the anchor nodes that expand the BSIDs. Since the number of labels that can be designated corresponds to the number of BSIDs saved through merging of the BSIDs, flexible route control can be realized in the entire network.

Example of Hardware Configuration

Figure 28:
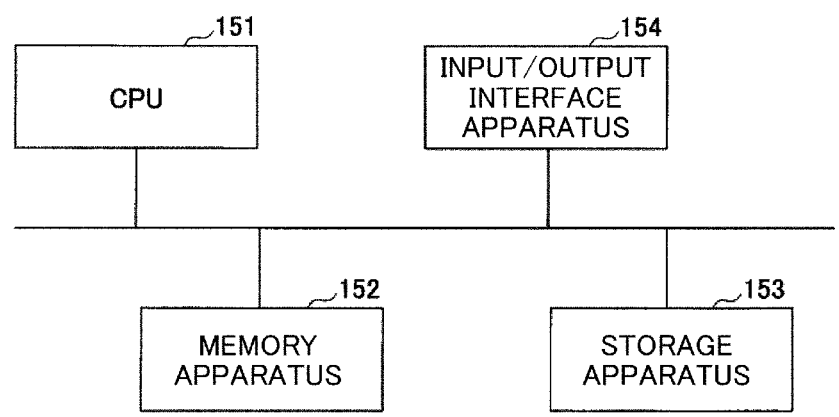
FIG. 28 is a hardware configuration of a controller according to an embodiment of the present invention.

FIG. 28 shows an example of a hardware configuration of the controller 100 according to an embodiment of the present invention. The controller 100 may also be a computer constituted by a processor such as a CPU (Central Processing Unit) 151, a memory apparatus 152 such as RAM (Random Access Memory) or a ROM (Read Only Memory), a storage apparatus 153 such as a hard disk, and the like. For example, the functions and processing of the computer 100 are realized by the CPU 151 executing data or a program stored in the storage apparatus 153 of the memory apparatus 152. Also, the input of data to the controller 100 may be performed from the input/output interface apparatus 154, and the output of data from the controller 100 may be performed by the input/output interface apparatus 154.

Supplement

Although an apparatus according to the embodiment of the present invention has been described with reference to functional block diagrams for the sake of convenience in the description, the apparatus according to the embodiment of the present invention may also be realized using hardware, software, or a combination thereof. For example, the embodiment of the present invention may also be realized using a program for causing a computer to realize the functions of the apparatus according to the embodiment of the present invention, a program for causing a computer to execute the procedures of the method according to the embodiment of the present invention, and the like. The functional units may also be used in combination according to need. The method according to the embodiment of the present invention may also be realized in an order different from the order shown in the embodiment.

Although a method for reducing the number of labels stacked in a packet in SR was described above, the present invention is not limited to the above-described embodiment and can be modified and adapted in various ways within the scope of the claims.

REFERENCE SIGNS LIST

100 Controller
110 NW information acquisition apparatus
111 Communication unit
112 Information management unit
113 Link state information computation unit
114 Data transmission information table
115 Link state information table
116 Route information table
120 SR route creation apparatus
121 Communication unit
122 SR route creation unit
123 Policy information table
130 Route compression apparatus
131 Communication unit
132 Anchor node information extraction unit
133 Compression computation unit
134 Anchor node information table
140 SR policy distribution apparatus
141 Communication unit
142 Information management unit
143 Compressed route management table

The invention claimed is:

1. A control apparatus configured to, in a network constituted by a plurality of communication apparatuses, control one or more anchor nodes designated in advance among the plurality of communication apparatuses, the control apparatus comprising:
   a route creation unit configured to create route information including labels of communication apparatuses or links to be passed through, based on an input required condition;
   a route compression unit configured to divide the labels included in the route information in units of anchor nodes, and compress at least a portion of the labels included in the route information into a compressed label that can be expanded in at least one anchor node among the communication apparatuses determined based on the route information, so as not to exceed a processing limit of a communication apparatus determined based on the route information; and
   a distribution unit configured to distribute information for expanding the compressed label to the at least one anchor node,
   wherein the route compression unit is configured to merge compressed labels together in a range of not exceeding a processing limit of a communication apparatus determined based on the route information, and the distribution unit is configured to distribute information for expanding the merged compressed labels.

2. The control apparatus according to claim 1, wherein the route compression unit is configured to replace a plurality of labels in the route information with a label that is equivalent to a partial route designated by the plurality of labels and that indicates a communication apparatus serving as an end point of the partial route.

3. The control apparatus according to claim 1, wherein the route compression unit is configured to terminate a route at an anchor node so as not to exceed the processing limit of a communication apparatus determined based on the route information, and create new route information that sets the anchor node at which the route was terminated as a starting point of a route, and the distribution unit is configured to distribute the new route information to the anchor node at which the route was terminated.

4. The control apparatus according to claim 1, further comprising a network information acquisition unit configured to acquire network information from the one or more anchor nodes and acquire a processing limit of a communication apparatus.

5. The control apparatus according to claim 4, wherein the route creation unit is configured to create route information satisfying the input required condition further based on the acquired network information.

6. A control method to be executed by a control apparatus configured to, in a network constituted by a plurality of communication apparatuses, control one or more anchor nodes designated in advance among the plurality of communication apparatuses, the control method comprising:
    creating route information including labels of communication apparatuses or a links to be passed through, based on an input required condition;
    dividing the labels included in the route information in units of anchor nodes, and compressing at least a portion of the labels included in the route information into a compressed label that can be expanded in at least one anchor node among the communication apparatuses determined based on the route information, so as not to exceed a processing limit of a communication apparatus determined based on the route information;
    distributing information for expanding the compressed label to the at least one anchor node; and
    merging compressed labels together in a range of not exceeding a processing limit of a communication apparatus determined based on the route information, and distributing information for expanding the merged compressed labels.

7. A non-transitory computer readable medium comprising a program for causing a computer to function as units of a control apparatus including performing operations comprising:
    creating route information including labels of communication apparatuses or links to be passed through, based on an input required condition;
    dividing the labels included in the route information in units of anchor nodes;
    compressing at least a portion of the labels included in the route information into a compressed label that can be expanded in at least one anchor node among the communication apparatuses determined based on the route information, so as not to exceed a processing limit of a communication apparatus determined based on the route information;
    distributing information for expanding the compressed label to the at least one anchor node; and
    merging compressed labels together in a range of not exceeding a processing limit of a communication apparatus determined based on the route information, and distributing information for expanding the merged compressed labels.

\* \* \* \* \*